Sept. 15, 1925.  
G. HADRICH  
VEHICLE TIRE  
Filed March 7, 1925
1,554,158
2 Sheets-Sheet 1
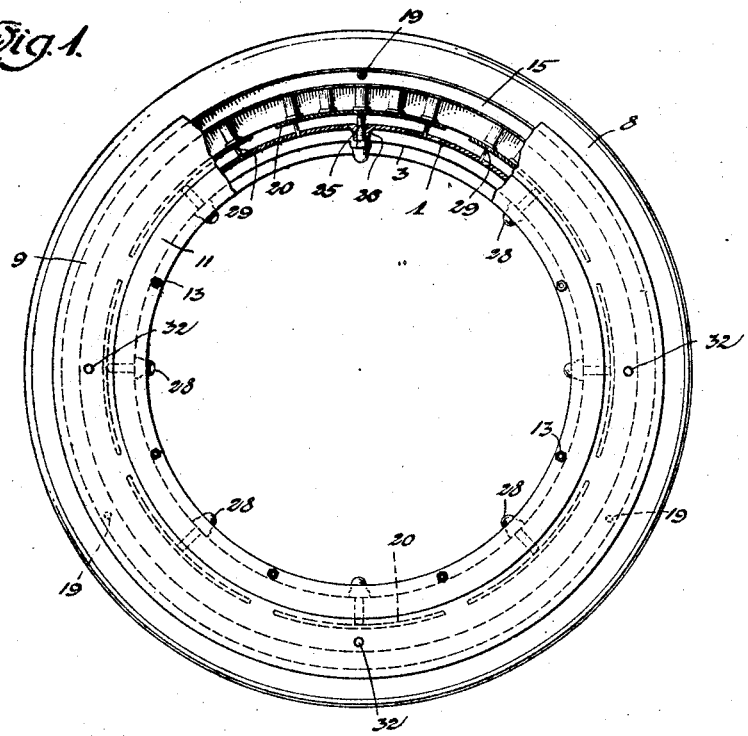
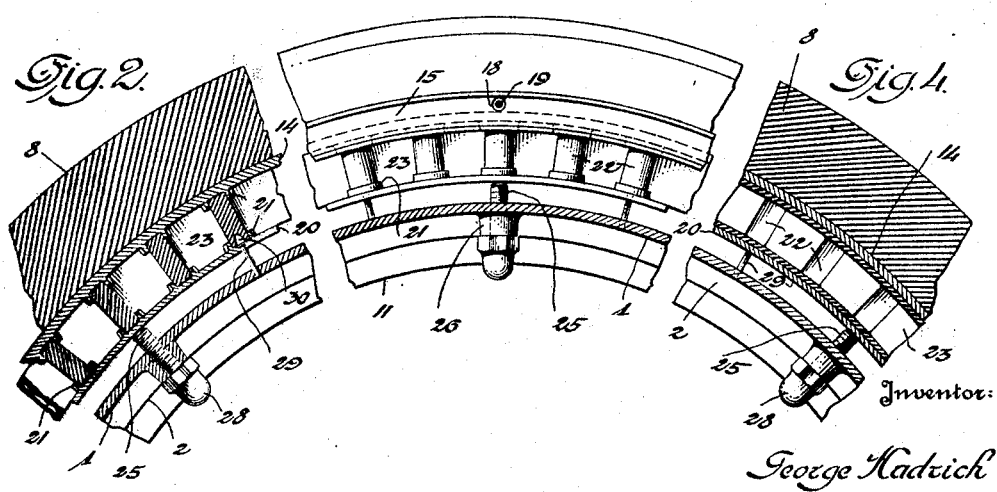
Inventor:  
George Hadrich  
By  
Attorneys.

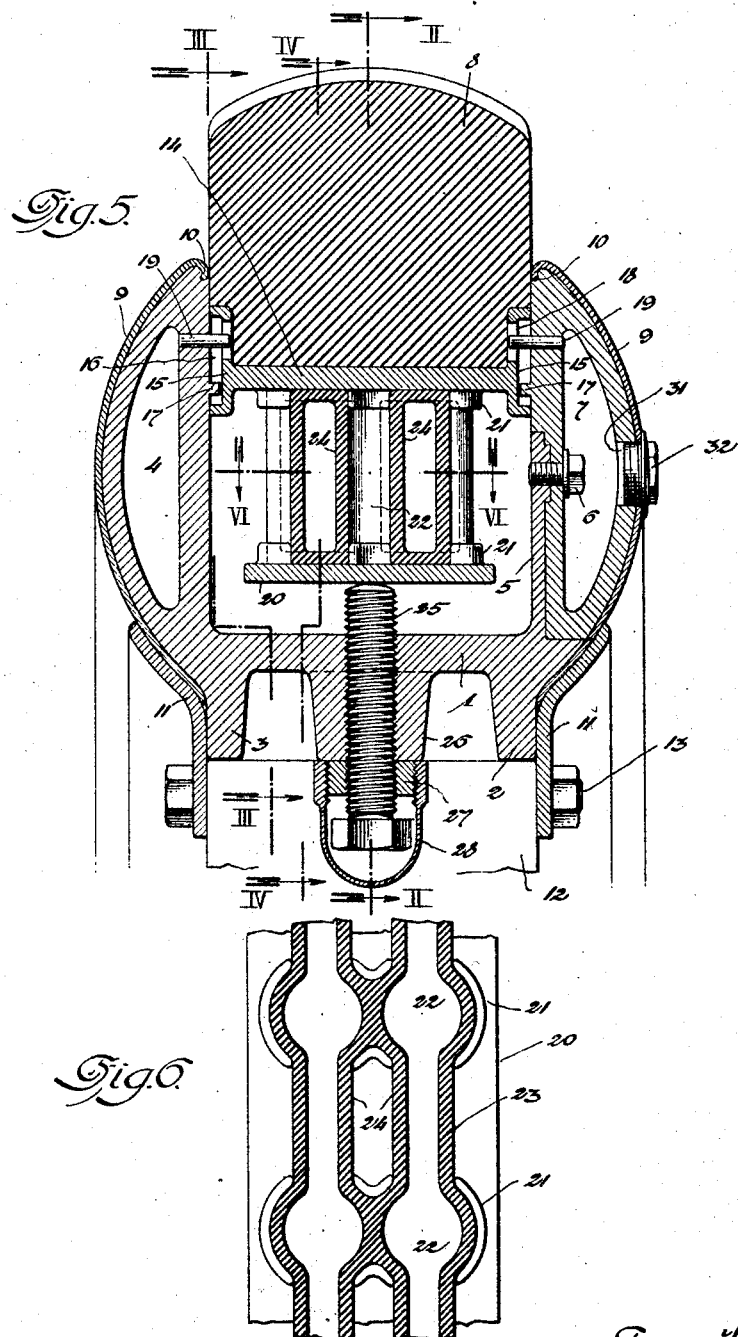

Patented Sept. 15, 1925.

1,554,158

UNITED STATES PATENT OFFICE.

GEORGE HADRICH, OF HIGHLAND PARK, MICHIGAN.

VEHICLE TIRE.

Application filed March 7, 1925. Serial No. 13,746.

*To all whom it may concern:*

Be it known that I, GEORGE HADRICH, a citizen of the United States, residing at Highland Park, in the county of Wayne and State of Michigan, have invented certain new and useful Improvements in Vehicle Tires, of which the following is a specification, reference being had therein to the accompanying drawings.

This invention relates to vehicle tires and the primary object of my invention is to provide a novel rim for a solid rubber tire, or other yieldable tread member, which is adjustably supported and adapted to be cushioned by a compressible member within the tire rim.

Another object of this invention is to provide a strong and durable wheel rim having a detachable side member which permits of the tire being easily and quickly assembled relative to the rim.

A further object of my invention is to provide a tire possessing the resilient and cushioning characteristics of an ordinary pneumatic tire, but devoid of springs and such elements that deteriorate and cause tire troubles.

A still further object of my invention is to provide a vehicle tire that may be advantageously used on tractors, trucks, and other types of heavy-duty motor vehicles.

The above and other objects are obtained by a tire construction that will be hereinafter specifically described and then claimed, and reference will now be had to the drawings wherein Figure 1 is a side elevation of a tire, partly broken away and partly in section.

Figure 2 is a longitudinal sectional view of a portion of the tire, taken on the line II—II, of Figure 5.

Figure 3 is a longitudinal sectional view of a portion of the tire, taken on the line III—III, of Figure 5.

Figure 4 is a longitudinal sectional view taken on the line IV—IV, of Figure 5.

Figure 5 is an enlarged cross sectional view of a tire, and,

Figure 6 is a horizontal sectional view taken on the line VI—VI, of Figure 5.

In the drawings, the reference numeral 1 denotes a rim provided with inwardly projecting side flanges 2 and 3, and an inner outwardly projecting annular hollow wall 4. Opposite the inner wall 4, is an outwardly projecting annular web 5 and adapted to be attached to this web, by set screws 6, or other fastening means, is an outer hollow annular wall 7, adapted to cooperate with the inner wall 4 in forming a channel, into the outer portion of which extends the inner part of a solid rubber tire 8.

The annular walls, 4 and 7, are provided with covers 9, having outer inturned edges 10, in hooked engagement with the outer edges of the walls 4 and 7, said covers having the inner edges thereof held by detachable rings 11 adapted to be secured to a wheel body 12, by nut equipped bolts 13.

The wheel body 12 may be of a conventional form, including a hub, spokes, and a felloe. The rim 1 may be mounted on the felloe, or the outer ends of the spokes and suitably retained in engagement therewith.

The tire 8 is mounted in a channel member 14 and this channel member has side walls 15, providing annular grooves 16, into which extend annular ribs 17, carried by the confronting faces of the walls 4 and 7. The grooves 16 are of a greater width than the ribs 17, so that the channel member 14 may slide, with a limited action, between the walls 4 and 7, which brace and engage the side walls of the tire 8. The side walls 15 of the channel member 14 are provided with radially disposed slots 18, and extending into said slots are guide pins 19 carried by the walls 4 and 7, of the rim 1. The side walls 15 of the channel member 14 engage in the side walls of the tire 8, so that the side walls of the tire may be flush with the outer faces of the walls 15 for sliding engagement with the walls 4 and 7.

Disposed at intervals in the channel of the rim 1 are arcuate plates 20 and these plates and the channel member 14 have the confronting faces thereof provided with sets of bosses 21 for the tubular portions 22 of a continuous circumferentially disposed hollow cushioning member 23, said member having its tubular portions 22 connected by hollow webs 24. The cushioning member is preferably made of rubber and the plates 20 support said cushioning member in engagement with the channel member 14 by virtue of set screws 25 adjustable in bosses 26 of the rim 1. The set screws 25 may be held by lock nuts 27 and the outer ends of said screws may be enclosed by caps 28 mounted on the lock nuts 27 or the bosses 26.

The plates 20 are guided by pins 29 carried by the rim 1 and extending into openings provided therefor in the plates 20. The cushioning member 23 may have recesses 30 providing clearance for the ends of the guide pins 29.

By adjusting the screws 25, pressure may be brought to bear on the cushioning member 23 and from time to time the expansive force of the cushioning member may be regulated.

There may be four, or more, of the set screws 6, and easy access may be had to these set screws through openings 31 in the detachable wall 7, said openings being normally closed by screw plugs 32.

The tire 8 may be provided with any suitable tread and the rim and its side walls may be of metal; the tire 8 is well braced and protected. The cushioning member is also enclosed and protected against stone bruise. With this cushioning member possessing greater resiliency than the rubber tire 8, said cushioning member can be readily mounted in the channel of the rim and other parts easily assembled relative thereto.

It is thought that the utility of my vehicle tire will be apparent without further description and while in the drawing there is illustrated a preferred embodiment of my invention, it is to be understood that the structure elements are susceptible to such variations and modifications as to fall within the scope of the appended claims.

What I claim is:—

1. A vehicle tire construction comprising a rim having a fixed inner wall, an annular web, a detachable wall attached to said web, a tire between said walls, a channel member supporting said tire, a compressible cushioning member between said rim walls engaging said channel member, and means carried by said rim for compressing said cushioning member.

2. A vehicle tire construction, as called for in claim 1, wherein said cushioning member is made of rubber with hollow webs and hollow tubular portions.

3. A vehicle tire construction comprising a channel rim, a tire slidable in said rim, a channel member supporting said tire, adjustable plates in said channel rim, and a compressible cushioning member between said channel member and said plates, said compressible cushioning member being made of rubber and formed with hollow web and tubular portions.

In testimony whereof I affix my signature.

GEORGE HADRICH.